(12) United States Patent
West

(10) Patent No.: US 6,518,322 B1
(45) Date of Patent: Feb. 11, 2003

(54) CONVERSION OF CONTAMINATED POLYETHYLENE TEREPHTHALATE TO DECONTAMINATED POLYBUTYLENE TEREPHTHALATE

(75) Inventor: Simon M. West, Williamstown (AU)

(73) Assignee: Petrecycle Pty Ltd., Melbourne (AU)

( * ) Notice: Subject to any disclaimer, the term of this patent is extended or adjusted under 35 U.S.C. 154(b) by 0 days.

(21) Appl. No.: 09/623,388

(22) PCT Filed: Mar. 25, 1999

(86) PCT No.: PCT/AU99/00208
§ 371 (c)(1),
(2), (4) Date: Sep. 1, 2000

(87) PCT Pub. No.: WO99/50332
PCT Pub. Date: Oct. 7, 1999

(30) Foreign Application Priority Data

Mar. 27, 1998 (AU) .............................. PP 2614

(51) Int. Cl.⁷ .................................................. C08J 11/04

(52) U.S. Cl. .................................. 521/48.5; 521/48

(58) Field of Search .................... 521/44, 48, 48.5; 524/445, 495

(56) References Cited

U.S. PATENT DOCUMENTS

| 3,859,257 | A | | 1/1975 | Schade et al. ........... 260/75 M |
|---|---|---|---|---|
| 4,212,963 | A | | 7/1980 | Lehr et al. .................. 528/272 |
| 4,499,261 | A | | 2/1985 | Heinze et al. .............. 528/279 |
| 4,656,241 | A | | 4/1987 | Iida et al. .................... 528/279 |
| 4,877,572 | A | * | 10/1989 | Clarke et al. ................ 264/555 |
| 5,015,759 | A | * | 5/1991 | Lowe ........................... 560/91 |
| 5,266,601 | A | * | 11/1993 | Kyber et al. ................ 521/48.5 |
| 5,451,611 | A | * | 9/1995 | Chilukuri et al. .......... 521/48.5 |

FOREIGN PATENT DOCUMENTS

| DE | 27 34 924 | 2/1979 | .......... C08G/63/00 |
|---|---|---|---|
| DE | 42 20 473 | 5/1994 | ......... C08G/63/183 |

* cited by examiner

*Primary Examiner*—Edward J. Cain
*Assistant Examiner*—Katarzyna W. Lee
(74) *Attorney, Agent, or Firm*—Sheridan Ross PC

(57) ABSTRACT

Decontaminated crushed polyethylene terephthalate is converted to decontaminated PBT withtout requiring a catalyst by mixing with 1,4-butanediol under reduced pressure, transeterifying at 120–190° C., distilling off ethanediol and tetrahydrofuran under sub-atomspheric pressure. The method lowers costs, and decreases wasteful by-products and removes contaminants present in post-consumer PET, (e.g. paper, pigments, plastics, dyes, mineral sands, and clays) and chemical and water insoluble contaminants.

16 Claims, No Drawings

CONVERSION OF CONTAMINATED POLYETHYLENE TEREPHTHALATE TO DECONTAMINATED POLYBUTYLENE TEREPHTHALATE

FIELD OF THE INVENTION

The invention relates to an improved method for the conversion of contaminated polyethylene terephthalate (PET) scrap to decontaminated polybutylene terephthalate (PBT) giving ethanediol as a valuable by-product.

BACKGROUND OF THE INVENTION

PBT is one of the polyesters which is well used in industry as a stable strong thermoplastic with good blow moulding characteristics. There have been numerous developments in the industrial preparation of PBT. The initial problems revolved around the fact that 1,4-butanediol in the presence of acid will cyclise to form tetrahydrofuran which is a stable compound thus rendering the 1,4-butanediol unavailable for reaction, This side reaction affected the cost effectiveness of the process as 1,4-butanediol is an expensive reagent. This problem was initially solved with the discovery that PBT can be manufactured by transesterification of dimethyl terephthalate with 1,4-butanediol. The use of an ester as a source of the terephthalate component reduces the concentration of protons and consequently the quantity of 1,4-butanediol converted to tetrahydrofuran.

However, a significant amount of tetrahydrofuran is still produced and it is desirable to reduce this further.

The next series of developments focussed on fine tuning the transesterification of terephthalate esters with 1,4-butanediol.

In U.S. Pat. No. 3,859,257 a process is taught for producing a polyester polymer from 1,4-butanediol and a lower alkyl ester of a dicarboxylic acid which comprises the steps of:

(a) a catalytic precondensation of 1,4-butanediol and a lower alkyl ester of a dicarboxylic acid in a ratio of 1.05–1.25:1 at a temperature between 180–200° C. in the presence of an organotitanate catalyst while distilling off 1,4-butanediol and cleavage products; and (b) polycondensation of the product of (a) at a temperature between 250–310° C. in a vacuum in the presence of a polycondensation catalyst (eg, zinc acetate dihydrate).

This was an attempt to overcome the disadvantages of the prior art including reducing the excess of 1,4-butanediol used, the amount of catalyst used and problems with discolouration and reducing the amount of industrially worthless polyesters with cross-linked portions.

In U.S. Pat. No. 4,499,261 a continuous multi-step process is taught for making PBT by transesterifying dimethyl terephthalate with an excess of 1,4-butanediol in the presence of a titanium catalyst. This patent addressed the problem of equipment becoming plugged by the freezing of esters of low solubility. It teaches the use of feeding recycled 1,4-butanediol into the condensers to dissolve the esters. It also discloses the use of mole ratios, temperatures, pressures, residence times and quantity of catalyst to reduce the production of tetrahydrofuran thus enabling the 1,4-butanediol to be recycled without any purification steps.

In U.S. Pat. No. 4,212,963, the continuous production under high pressure conditions of PBT having a narrow molecular weight distribution, a low carboxyl group content and an intrinsic viscosity of from 0.2 to 1.34 dl/g is taught. This is achieved by carrying out the polycondensation in a two-phase flow tube in which thin layers of the molten reaction mixture are produced by means of a circular stream so that high polycondensation velocities and hence short residence times can be achieved. The methods involve catalysts in both the transesterification and polycondensation steps according to the prior art. This patent further relates to the apparatus used for the production of PBT from dimethyl terephthalate or terephthalic acid and 1,4-butanediol.

On another front, due to the amount of polyesters produced these days and the problems with waste disposal, there is now a focus on methods of recycling or reusing these polyesters, especially PET which is most commonly seen as containers including soft drink bottles.

There has been extensive work in the area of recycling PET. It has been found that it is best to degrade the polymer into the original monomers and then react the monomers together to regenerate the original PET (for example British patent 601,135). It is also known from British patent 610,136 that non commercially used PET will transesterify with ethanediol but the process does not allow for removal of contaminants which are present in post-consumer PET.

The contaminants in post-consumer PET include paper, pigments, other plastics (for example, polyvinylchloride), colouring dyes, mineral sands and clay. Chemical contaminants include hydrocarbons, polyamides, proteins, pesticides, sugar, and citric acid. Further, the United States Food and Drug Administration requires that any process which may produce products which are to come into contact with food, must be able to remove the following contaminants: toluene, lindane, arsenic, chloroform and diazone.

U.S. Pat. No. 5,266,601 (corresponds to German patent 4220473) teaches that PET scrap can be (i) depolymerised with 1,4-butanediol and a catalyst, (ii) transesterified with 1,4-butanediol and a catalyst and then (iii) repolymerised with catalyst to form PBT. This process does not allow for decontamination of post-consumer PET and therefore has a very limited feedstock. The specification expressly states that the process is designed for colourless PET and that pigmented PET should only be used if the resultant PBT is itself to be pigmented in a dark colour. The effects of pigment on the reaction process is to be remedied merely by varying the amount of catalyst and/or residence time. Accordingly, this process is unsuitable for dealing with post-consumer PET.

U.S. Pat. No. 5,451,611 discloses a method for converting PET waste to a poly(alkylene)terephthalate, in particular PBT. This citation does discuss the need for the PET waste to be thoroughly washed with water, cleaned to remove all foreign matter and dried to a moisture content of less than 0.5% before being shredded and pulverised to a powder before it can be used. However, this method does not deal with removal of contaminants which are not water soluble and which cannot be removed by manual cleaning. The subsequent process involves heating the pulverised PET in the presence of 1,4-butanediol and catalyst at various pressures for quite a considerable time. The method in the citation takes a minimum of 4 hours although all of the examples take considerably longer, even with the use of catalysts. If the time for the washing, drying, shredding and pulverising is included then the time involved to recycle post-consumer PET via this method is not commercially viable.

Decontamination of post-consumer PET was developed by the current inventor as disclosed in PCT/AU93/00198 titled "Improved polyethylene terephthalate decontamination". This invention teaches that PET scrap can be decontaminated by treating it with ethanediol at temperatures near 200° C. when the PET was uniquely found to become brittle due to partial transesterification. Foreign substances either dissolve in the hot solvent, react with the diol then dissolve or remain as discrete unreacted particles that survive subsequent crushing and are removed from the crushed PET by screening. This decontaminated crushed PET is called "crumb". It was subsequently discovered by the inventor that this decontamination process could be affected by any alkanediol, including 1,4-butanediol and 1,6-hexanediol (South African patent 95/2933). This decontamination process has received the approval of the American Food and Drug Administration for use with products which will eventually be in contact with food.

The word "crumb" as used in this description and in the claims refers to the decontaminated product prepared by (a) transesterifying material containing PET with diol(s) at a temperature about the boiling point of ethanediol for a period of time sufficient to form a mixture containing embrittled PET; and (b) crushing the mixture and separating crushed material containing PET from uncrushed contaminants. It will be readily apparent to those skilled in the art that while this discussion refers to contaminated material containing PET, especially post-consumer PET, non contaminated PET can be used to form the crumb and is intended to be within the scope of this invention.

PET is potentially a good feedstock for PBT manufacture as it is already an ester of terephthalic acid and if contaminated is cheap to acquire.

OBJECT OF THE INVENTION

Consequently, further investigations have been directed towards the process of producing decontaminated PBT from contaminated PET whilst reducing unnecessary cost, wasteful by-products and the other problems discussed in the prior art.

SUMMARY OF THE INVENTION

It has been surprisingly discovered that after crumb was prepared with 1,4-butanediol, it could be used to produce decontaminated PBT without the addition of any catalyst and the reaction completed in the same if not less time as the methods in the prior art which use a catalyst. In addition, the ethanediol released could be recovered as a by-product.

Thus, according to the present invention, a method is provided for converting crumb (as hereinbefore defined) to substantially decontaminated polybutylene terephthalate (PBT), comprising the following steps:

a) mixing the crumb with 1,4-butanediol under reduced pressure and at a temperature between 120–190° C. in a reaction vessel whilst degassing the reaction vessel;

b) transesterifying the mixture from step (a) at a temperature between 120–190° C. by increasing the pressure but still maintaining the pressure subatmospheric while ethanediol and tetrahydrofuran are distilled off; and c) polycondensing the product from step (b) at a temperature between 230–260° C. under reduced pressure to generate decontaminated PBT.

In another embodiment of the invention, a method is provided for converting crumb (as hereinbefore defined) to decontaminated polybutylene terephthalate (PBT), comprising the following steps:

a) mixing the crumb with 1,4-butanediol under reduced pressure and at a temperature between 120–190° C. in a reaction vessel whilst degassing the reaction vessel;

b) transesterifying the mixture in step (a) at a temperature between 120–190° C. by increasing the pressure but still maintaining the pressure sub-atmospheric while ethanediol and tetrahydrofuran are distilled off, c) decontaminating the mixture from step (b) by adding activated carbon and/or activated clay and then removing the activated clay and/or activated carbon by pressure filtration; and d) polycondensing the product from step (c) at a temperature between 230–260° C. under reduced pressure to generate decontaminated PBT.

Preferably, the reduced pressure in the degassing step is as close to a vacuum as possible to remove all the dissolved gas from the mixture. It is important to remove all the oxygen from the reaction vessel if an undesirable yellow colour is to be avoided in the product. Thus, the reaction vessel is kept at this lower pressure only for as long as is necessary to remove all the gas and then the transesterification is allowed to commence.

Preferably, the subatmospheric pressure in the transesterification step is between 0.2530–0.760 bar. Preferably, either the temperature or pressure in the transesterification step is modified during the reaction to maximise the removal of ethanediol while minimising the removal of 1,4-butanediol.

Preferably, the ratio of 1,4-butanediol to contained terephthalic acid is at least 1.1:1 mole. (The contained terephthalic acid was calculated by saponifying a sample of the PET and recovering the terephthalic acid.) This ratio is determined by the desired final product concentration of ethanediol. The reaction time of the transesterification step is less than one hour but it would be understood that the shorter the reaction time the more ethanediol remains.

Preferably, the ethanediol distilled off is recovered as it is a valuable by-product. Preferably, any tetrahydrofuran distilled off is recovered as it is also a valuable by-product.

Preferably, the polycondensation step occurs under a reduced pressure of between 100 to 10 mbar. Preferably, the time of reaction in the polycondensation step is between 45 to 90 minutes.

It will be readily apparent to persons skilled in the art that the separation between where one step of the reaction finishes and the next commences is not clearly defined and depends on the desired final product concentration of ethanediol.

It is not necessary to add any catalyst to the polycondensation step for the reaction to proceed in the same if not less time as the methods in the prior art which use a catalyst. However, if even faster reaction times are demanded then a variety of suitable catalysts which are known art may be used. These catalysts include antimony, germanium, titanium and mixed titanium/zirconium catalysts. However, the complete lack of added catalyst is a considerable advantage as that cost is removed entirely.

The second embodiment includes a step which allows for further decontamination where a very clean final product is required. The use of the adsorbents, activated clay and/or activated carbon, enables removal of any residual insolubles, colours and chemical contaminants. The method of pressure filtration used in the decontamination step in the second embodiment can be any method known in the art.

The invention will now be further illustrated by the following non-limiting example.

EXAMPLE 1

30 kg of washed PET bottle scrap were dried in 1,4-butanediol at 80° C. for 30 minutes then embrittled by treating with a spray of 1,4-butanediol at 210° C. for 50 minutes, crushed and screened to remove about 0.5% PVC and 0.1% paper label fragments. Hindered settling was then used on the resulting product to remove residual glue and paper fibre and the crumb recovered on a filter.

A 100 g sample of the crumb was taken into a 500 ml flask with 70 g of 1,4-butanediol (this results in a mole ration of 1,4-butanediol to PET of 2.3:1 after taking into account that crumb contains approx 30% 1,4-butanediol) and evacuated while heating to 150° C. then the vacuum was disconnected and the pressure allowed to rise to 0.3 bar and maintained. The flask was well stirred and the mass liquefied in 20 minutes. The vapour was condensed and the ethanediol recovered. Then, 0.1% of activated carbon and 0.1% of activated clay were added to the liquid mass and the mixture stirred for a further 10 minutes. The mixture was then filtered in a hot pressure filter to remove the loaded adsorbents and the liquid mass transferred back to a 250 ml flask.

The liquid mass was then polymerised by removing ethanediol and butanediol under 0.01 to 0.1 bar at a temperature between 230 to 250° C. to give decontaminated PBT in 60 minutes.

EXAMPLE 2

A 100 g sample of crumb prepared as in example 1 above was taken into a 500 ml flask with 70 g of 1,4-butanediol (this results in a mole ratio of 1,4-butanediol to PET of 2.3:1 after taking into account that crumb contains approx 30% 1,4-butanediol) and evacuated while heating to 150° C. then the vacuum was disconnected and the pressure allowed to rise to 0.3 bar and maintained. The flask was well stirred and the mass liquefied in 20 minutes. The vapour was condensed and the ethanediol recovered.

The liquid mass was then polymerised by removing ethanediol and butanediol under 0.01 to 0.1 bar at a temperature between 230 to 250° C. to give decontaminated PBT in 60 minutes.

The product was pale yellow with some haze but was suitable for applications with opacifiers and colours.

The word 'comprising' and forms of the word 'comprising' as used in this description and in the claims does not limit the invention claimed to exclude any variants or additions which are obvious to the person skilled in the art and which do not have a material effect upon the invention.

Modifications and improvements to the invention will be readily apparent to those skilled in the art. Such modifications and improvements are intended to be within the scope of this invention.

The claims defining the invention are as follows:

1. A method for converting crumb to substantially decontaminated polybutylene terephthalate (PBT), comprising the following steps:
   a) mixing the crumb with 1,4-butanediol under reduced pressure and at a temperature between 120–190° C. in a reaction vessel whilst degassing the reaction vessel;
   b) transesterifying the mixture from step (a) at a temperature between 120–190° C. by increasing the pressure but still maintaining the pressure sub-atmospheric while ethanediol and tetrahydrofuran are distilled off; and
   c) polycondensing the product from step (b) at a temperature between 230–260° C. under reduced pressure to/generate decontaminated PBT.

2. The method according to claim 1 in which the sub-atmospheric pressure in step (b) is between 0.253–0.760 bar.

3. The method according to claim 1 in which the ratio of 1,4-butanediol to contained terephthalic acid is at least 1.1:1 mole.

4. The method according to claim 1 in which the reaction time in step (b) is less than one hour.

5. The method according to claim 1 in which the ethanediol distilled off in step (b) is recovered.

6. The method according to claim 1 in which step (c) occurs under a reduced pressure of between 100 to 10 mbar.

7. The method according to claim 1 in which the time of reaction in step (c) is between 45 to 90 minutes.

8. The method according to claim 1 in which a catalyst is added to step (c).

9. A method for converting crumb to substantially decontaminated polybutylene terephthalate (PBT), comprising the following steps:
   a) mixing the crumb with 1,4-butanediol under reduced pressure and at a temperature between 120–190° C. in a reaction vessel whilst degassing the reaction vessel;
   b) transesterifying the mixture from step (a) at a temperature between 120–190° C. by increasing the pressure but still maintaining the pressure sub-atmospheric while ethanediol and tetrahydrofuran are distilled off;
   c) decontaminating the mixture from step (b) by adding activated carbon and/or activated clay and then removing the activated clay and/or activated carbon by pressure filtration; and
   d) polycondensing the product from step (c) at a temperature between 230–260° C. under reduced pressure to generate decontaminated PBT.

10. The method according to claim 9 in which the sub-atmospheric pressure in step (b) is between 0.253 to 0.760 bar.

11. The method according to claim 9 in which the ratio of 1,4-butanediol to contained terephthalic acid is at least 1.1:1 mole.

12. The method according to claim 9 in which the reaction time in step (b) is less than one hour.

13. The method according to claim 9 in which the ethanediol distilled off in step (b) is recovered.

14. The method according to claim 9 in which step (d) occurs under a reduced pressure of between 100 to 10 mbar.

15. The method according to claim 9 in which the time of reaction in step (d) is between 45 to 90 minutes.

16. The method according to claim 9 in which a catalyst is added to step (d).

* * * * *